June 3, 1952  A. L. LEE  2,599,061
SHUTTLE CAR
Filed Dec. 3, 1947  3 Sheets-Sheet 1

INVENTOR;
ARTHUR L. LEE,
BY
ATT'Y.

June 3, 1952     A. L. LEE     2,599,061
SHUTTLE CAR
Filed Dec. 3, 1947     3 Sheets-Sheet 2
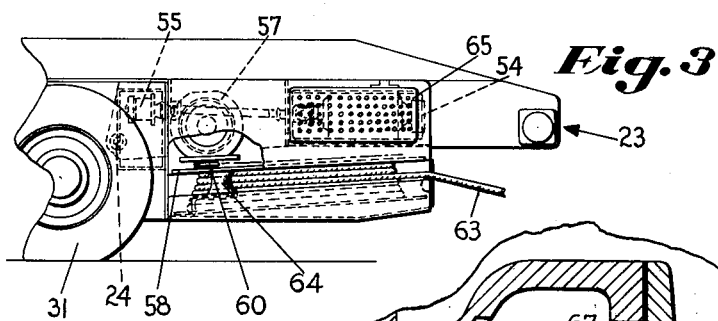
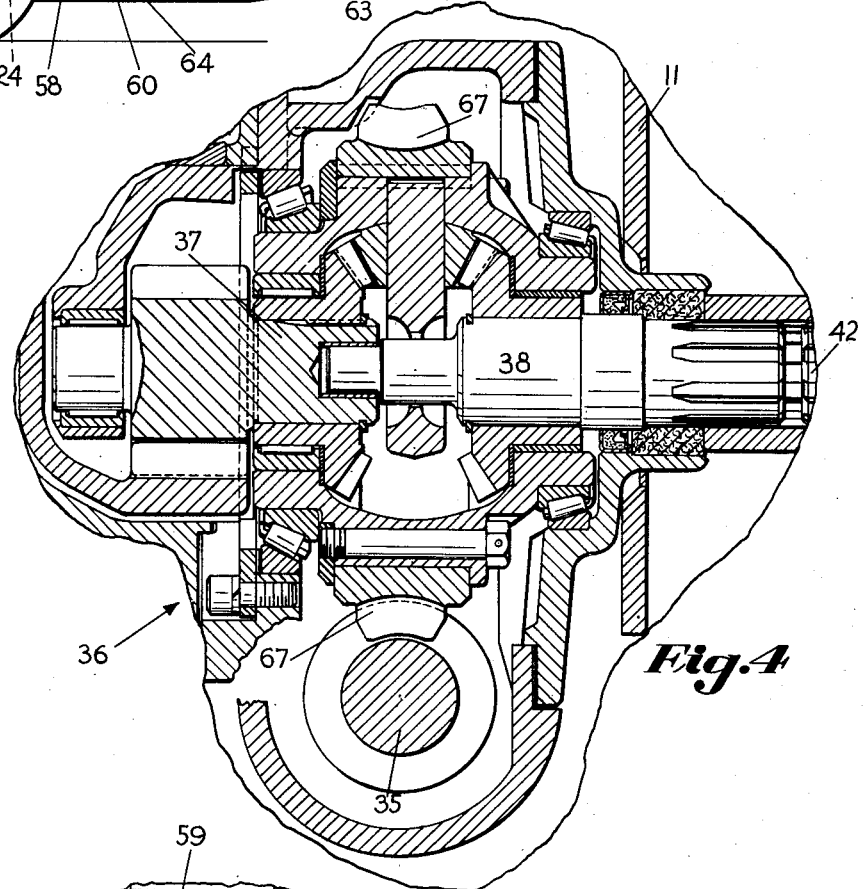
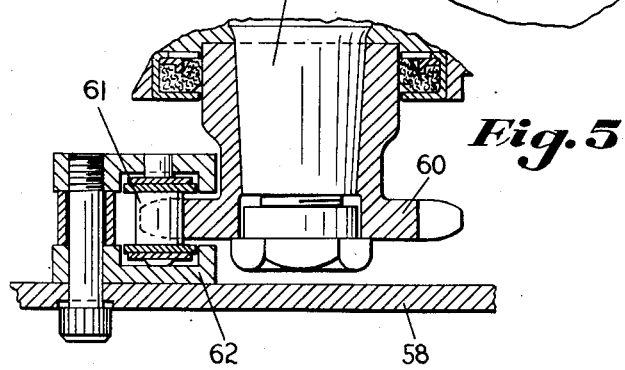
INVENTOR:
ARTHUR L. LEE,
BY
ATT'Y.

Patented June 3, 1952

2,599,061

UNITED STATES PATENT OFFICE 2,599,061

SHUTTLE CAR

Arthur L. Lee, Upper Arlington, Ohio, assignor to The Jeffrey Manufacturing Company, a corporation of Ohio Application December 3, 1947, Serial No. 789,384

6 Claims. (Cl. 214—83.36)

This invention relates to a shuttle car, and an object of the invention is to provide an improved shuttle car in which the load carrying capacity is very high for any predetermined height, length and width.

A more specific object of the invention is to provide a shuttle car in which there are four power driven steerable wheels provided with improved drive gearing for driving the wheels in pairs near opposite ends of the vehicle through drive gearing including a worm type differential which makes for a high ratio of body width to tread or wheel gage.

Another object of the invention is to provide an improved shuttle car in which the load carrying capacity is made relatively great for any given dimensions, in that substantially all of the driving motors for the various motor driven devices are located laterally of a conveyer which forms the bottom of the load carrying body and extends through a boom adjacent the discharge end thereof.

Still another object of the invention is to provide an improved relation of parts in a shuttle car which contributes to high capacity involving the locating of an operator's station adjacent and to one side of the discharge boom of the shuttle car, there being a pair of operating motors adjacent the other side of said boom, below which is a cable reel mounted for rotation on an upright axis and driven by one of said motors, the reel extending at least in part below the discharge boom.

Other objects of the invention will appear hereinafter, the novel features and combinations being set forth in the appended claims.

In the accompanying drawings,

Fig. 3 is a side elevational view showing particularly the discharge end and discharge boom and associated cable reel of the shuttle car;

Fig. 4 is a detailed sectional view showing the worm driven differential of the drive gearing between one of the wheel driving motors and a pair of steerable drive wheels;

Fig. 5 is a detailed sectional view showing a portion of the drive gearing for the cable reel.

Figure 1:
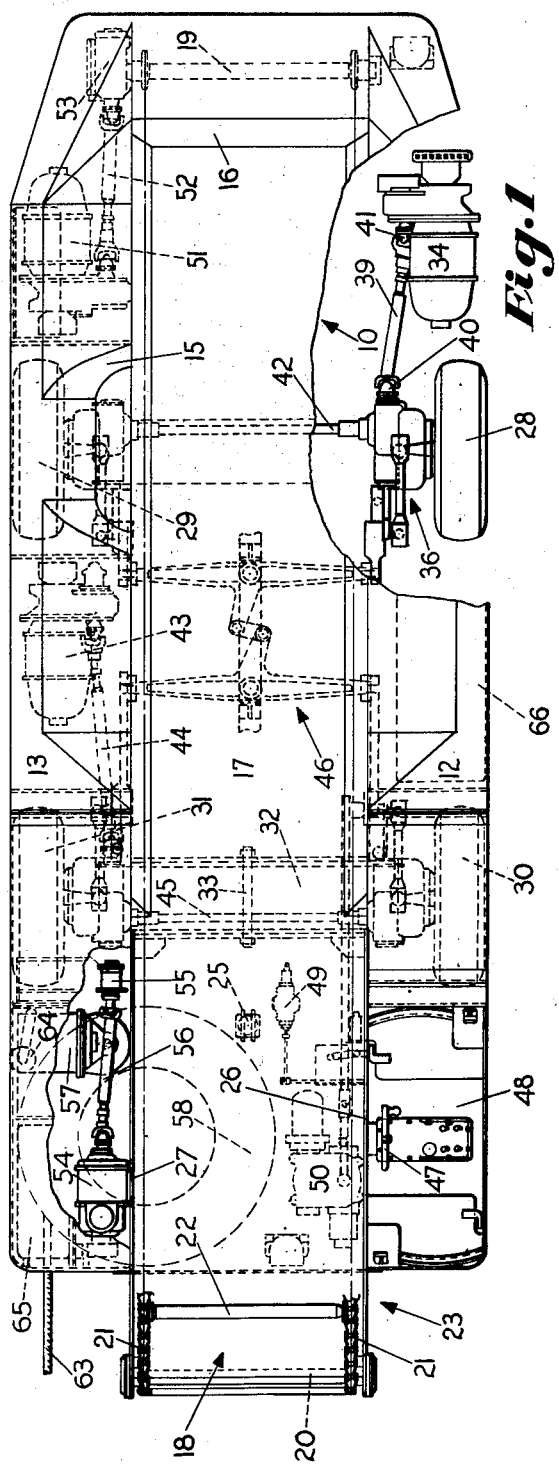
Fig. 1 is a plan view of a shuttle car embodying the features of my invention, with parts broken away.
Figure 2:
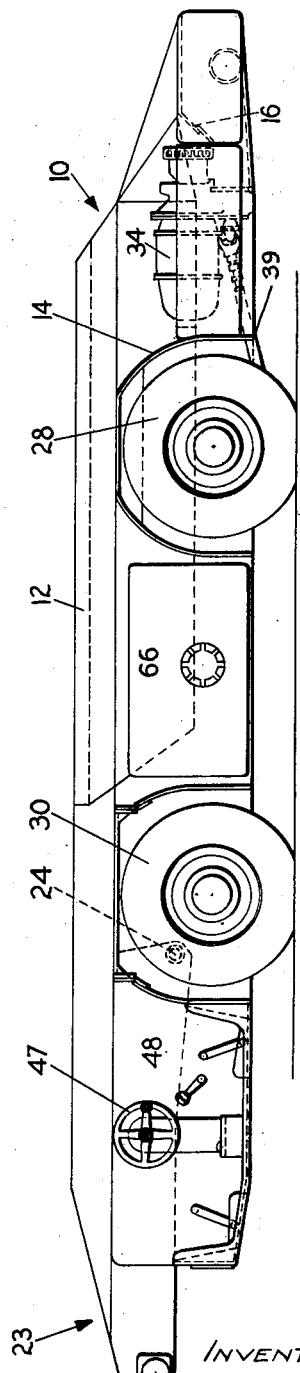
Fig. 2 is a side elevational view of said shuttle car.

Referring particularly to Figs. 1 and 2 of the drawings it will be seen that the shuttle car of my invention involves a load carrying body 10 which is mounted upon a main frame, one of the side members of which is seen at 11 in Fig. 4 of the drawings. The load carrying body 10 includes laterally spaced sloping side walls 12 and 13 provided with wheel receiving wells 14 and 15 and an end wall 16, said walls 12, 13 and 16 all sloping inwardly and downwardly to a bottom plate 17 which constitutes the bottom of the open top load carrying body 10 and forms the material supporting plate of a longitudinally extending endless conveyer 18. Conveyer 18 includes a driving head shaft 19 and a tail or discharge shaft 20 between which a pair of endless chains 21 run. Extending between the chains 21 is a plurality of conveyer flights 22 which in traveling along their upper run or over the bottom plate 17 convey coal or other material in the body 10 rearwardly along said plate 17, discharging it over the tail shaft 20.

Adjacent the rear the body 10 includes a discharge boom 23 which is formed by a portion of the bottom plate 17 which is preferably severed with respect to the adjoining portion which is rigidly attached to the main frame of the vehicle, the boom 23 being preferably but not necessarily pivotally mounted upon a horizontal axis by pivot means 24 and being adjustable so as to raise and lower the discharge position of the rear end of said boom 23 by means of a hydraulic jack 25. In addition to the bottom plate 17 the boom 23 also includes substantially vertical side walls 26 and 27. The tail shaft 20 is, of course, actually carried at the rear end of the boom 23 and the working run of the conveyer 18 conveying material rearwardly travels successively over the bottom of the main body portion 10 and communicating boom 23, both of which constitute load carrying portions of the shuttle car.

In the preferred form of my invention the shuttle car includes two pairs of power driven steerable wheel assemblies, there being a pair of wheel assemblies 28 and 29 near the front end of the vehicle within the wells 14 and 15, respectively. The wheel assemblies 28 and 29 are of similar construction, except that one of them is provided with a differential, the other, of course, eliminating the differential, this feature being broadly similar to that disclosed and claimed in my application Serial No. 518,810, filed January 19, 1944, entitled Shuttle Car, now Patent No. 2,457,569, dated December 28, 1948; the actual drive gearing, however, from the differential to the individual wheels being different as hereinafter explained.

Near the rear end of the shuttle car there is a second pair of power driven steerable wheel assemblies 30 and 31 which are similar to wheel assemblies 28 and 29. The wheel assemblies 28 and 29 are preferably mounted directly on the main frame of the shuttle car, while the wheel assemblies 30, 31 are mounted on a cross member 32 which is pivotally attached to the main frame at its center along a longitudinally extending horizontal axis provided by pivot means 33.

In order to provide very high carrying capacity for the shuttle car for any predetermined tread of the wheels 28, 29, 30 and 31 and for any given length of the vehicle it is, of course, desirable that the body 10 and the boom 23 be as wide as possible, particularly adjacent the bottom. In other words, it is desirable that the bottom plate 17 be just as wide as possible. To provide a very wide bottom plate while retaining the desirable characteristics of driving the wheel assemblies adjacent opposite ends in pairs from a common driving motor through a differential, it has been found desirable to employ a worm type of differential. In other words, the worm type differential allows a greater width of bottom plate 17 or greater width of the body 10 for any given tire tread or gage in a drive of the above general character incorporating the features which have been found particularly desirable.

Therefore I drive the wheel assemblies 28 and 29 from a common electric motor 34 which is connected to a worm 35 driving a worm type ring gear 67 (see Fig. 4) of a differential mechanism 36, which differential mechanism in turn has differentially connected oppositely extending drive shafts 37 and 38 having a common transverse horizontal axis, the former of which drives a dished gear 69 which in turn drives the wheel of the assembly 28 through a universal joint. The drive from the shaft 37 to the wheel preferably follows the disclosure of my Patent No. 2,381,672, dated August 7, 1945, rather than my said Patent No. 2,457,569. Stated another way, the drive which I prefer to use is essentially that of my Patent 2,381,672, except the differential has been modified to provide a worm type differential, it having been found that this allows a wider frame to be placed between the wheel assemblies for any given gage, tread or distance between said wheel assemblies.

Figure 6:
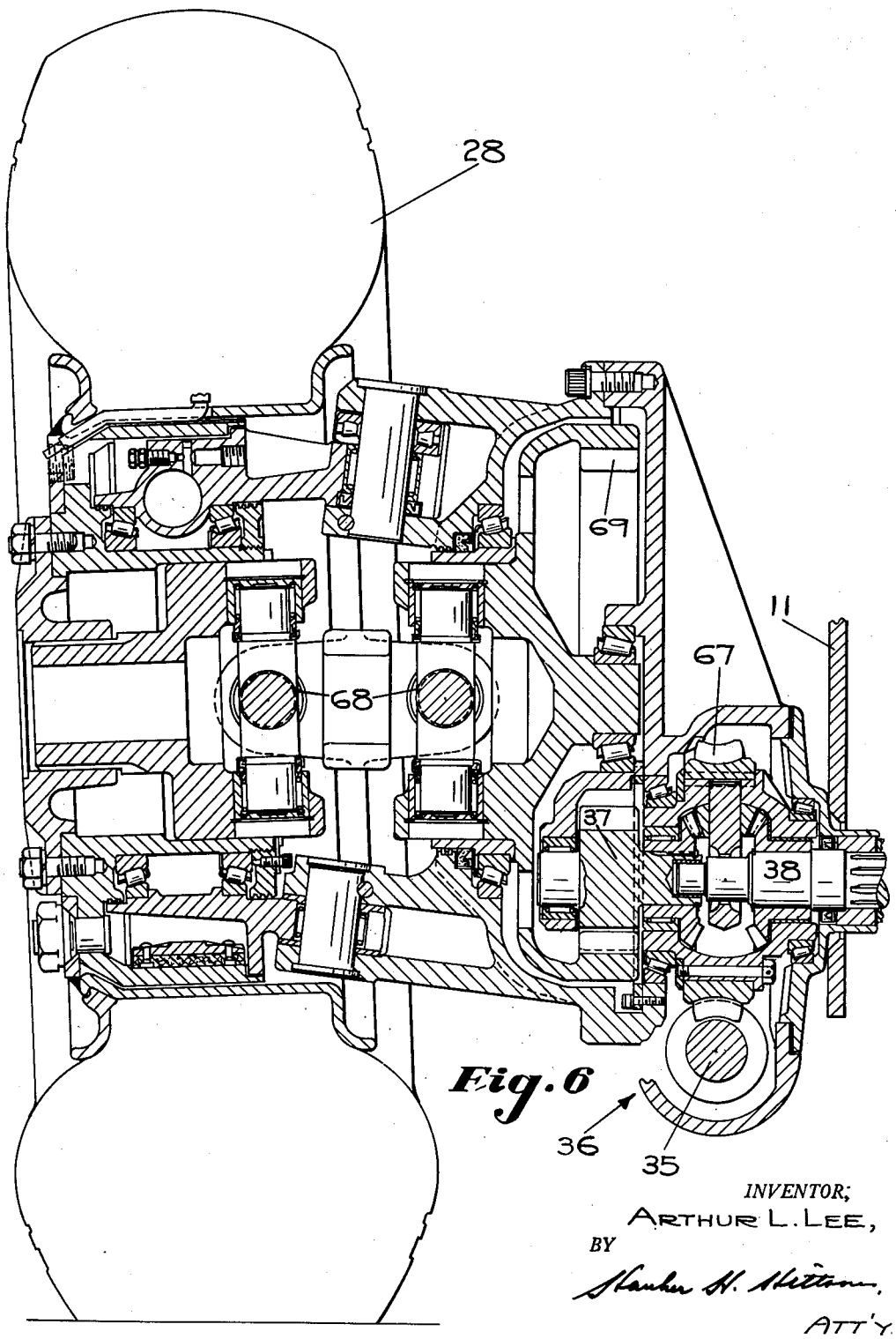
Fig. 6 is a sectional elevational view of one of the wheel assemblies.

The general wheel assembly is illustrated in Fig. 6 of the drawings but since it follows in detail the disclosure of my Patent No. 2,381,672, except for the worm type differential above mentioned, it needs no special description beyond pointing out certain important elements and relations which contribute to the improvement herein claimed. The gearing from the drive shaft 37 to the wheel of the assembly 28 includes a double universal joint 68 and a large internally toothed gear 69, the axis of which is substantially along the axis of rotation of the wheel of assembly 28. It is thus evident that the common axis of the two drive shafts 37 and 38 is appreciably spaced from the axis of rotation of the wheel of the assembly 28 and, as illustrated in the drawings, is below it, which is important since the shaft 38 is in alignment with a shaft 42 extending to wheel assembly 29 on the opposite side of the vehicle. It is desirable in the interest of high capacity that this shaft 42 be as low as possible since it is preferably below the bottom plate 17.

It is furthermore to be noted, particularly by reference to Figs. 4 and 6 of the drawings, that the axis of the worm 35 is spaced from the common axis of the shafts 37, 38 and 42 and this spacing is in the same direction as the spacing between the common axis of said shafts 37, 38 and 42 and the axis of rotation of the wheel of the assembly 28. Specifically the axis of worm 35 is appreciably below the common axis of shafts 37, 38 and 42. The importance of this spacing is described hereinafter.

The differential mechanism 36 is connected to the main frame member 11 on one side thereof laterally outside the dimensions of said main frame and of said load carrying body 10. Likewise, the adjacent driving motor 34 which drives the worm 35 is located outside the lateral confines of the main frame and laterally of the adjacent side wall 12 of said body 10. Motor 34 is located longitudinally beyond the periphery of the adjacent wheel 34, to the end that said wheel 28 in swinging during its steering operation will not hit said motor 34. Thus the motor 34 does not restrict the angle through which steerable wheel 28 can swing to effect steering. Said motor 34 is connected to the worm 35 through a splined telescoping drive shaft 39 and a pair of universal joints 40 and 41, one at each end thereof. The positioning of the motor 34 as well as the differential casing 36 laterally of the main frame member 11 obviously positions both of them entirely laterally or to the side of the conveyor 18, as a consequence of which the bottom plate 17 may be positioned very low in the body 10, or, in other words, quite close to the mine floor which contributes to the high overall capacity of said body 10. The two wheel assemblies 28 and 29 are interconnected by cross shaft 42 which is splined to the aforementioned shaft 38 and which drives the wheel assembly 29. Cross shaft 42 is below the plate 17 and consequently below the upper run of the conveyer 18 and is preferably between the upper and lower runs thereof, similar to the arrangement in the shuttle car disclosed in my Patent No. 2,457,569.

The steerable wheel assemblies 30 and 31 are also driven as a pair from a common electric driving motor 43 through appropriate universal joints and splined drive shaft 44 which drives a worm of a differential mechanism adjacent the wheel assembly 31 which is similar to the assembly above described in association with the wheel assembly 28. Wheel assemblies 30 and 31 are in turn driven from the oppositely extending shafts of the above mentioned differential, the former through a cross shaft 45 which is generally similar to cross shaft 42 and extends between the upper and lower runs of the conveyer 18 and below the plate 17. Here again it is to be particularly noted that both the differential of the driving wheel assemblies 30 and 31 and the motor 43 are positioned laterally of the conveyer 18 and laterally of the side main frame member corresponding to main frame member 11, though on the opposite side of the unit. It is also to be noted that motor 43 is longitudinally beyond the periphery of the wheel of assembly 31 and is located longitudinally inwardly thereof and thus longitudinally between the wheel assemblies 29 and 31.

All of the wheel assemblies 28, 29, 30 and 31 are also preferably steerable as well as power driven and to this end steering mechanism generally designated by the reference character 46 is provided which may, for example, follow that disclosed in complete detail in my application Serial No. 771,542, filed August 30, 1947.

As above set forth the axis of the worm 35 is spaced an appreciable distance from the axis of rotation of the wheel of assembly 28 and, specifically, is appreciably below it. It is likewise appreciably spaced from the common axis of rotation of shafts 37, 38 and 42 and is also appreciably below this common axis, which axis itself is appreciably below the axis of rotation of the wheel of the assembly 28.

As a consequence of this structure the axis of the drive shaft 39 which interconnects the motor 34 and the worm 35 is spaced an appreciable distance from and below the axis of rotation of the wheel of the assembly 28. Therefore the wheel of assembly 28 in effecting a steering operation can swing through a greater angle before striking the shaft 39 than would be possible if the axis of said shaft 39 intersected the axis of rotation of the wheel of assembly 28. In other words, considering Fig. 2 of the drawings, if the axis of the shaft 39 extended through the center of the wheel of assembly 28 it is obvious that as the rear end of the wheel of said assembly 28 was swung toward the shaft 39 it would strike it sooner than it would with the shaft 39 in the lowered position illustrated. This, of course, is due to the curvature of the periphery of the wheel of said assembly 28.

Therefore, the worm drive for the differential mechanism 36 contributes in two particulars, both of which tend to increase the capacity of the load carrying body without diminishing the steerability of the unit. First, of all, this unit actually requires a less axial dimension between the main frame side member 11 and the face of the gear 69 which allows a somewhat wider load carrying body for the same wheel gauge. Secondly, it increases the distance between the axis of rotation of the steerable wheel and the axis of the connecting drive shaft 39 between the driving motor 34 and the worm 35 which allows a smaller dimension between a vertical plane through the axis of the worm 35 and a vertical plane through the wheel of assembly 28, when it is in its straight-ahead position, for the same amount of steering swinging movement of the wheel of assembly 28, as compared with the drive arrangement, for example, of my Patent No. 2,457,569 in which a beveled pinion and ring gear 57, 59 is provided and in which the axis of the pinion gear 57 is substantially along the common axis of the shafts 63 and 64 which are generally comparable with the shafts 37 and 38 of this application.

While the above relation of parts has been described particularly in connection with the driving motor 34 and associated wheel assembly 28, it is, of course, understood that the same fundamental relation exists between the motor 43, the shaft 44 and the wheel assembly 31. In this connection it is to be noted, however, that motor 43 is located between the two wheel assemblies 29 and 31. Stated another way, motor 43 is longitudinally inwardly of the wheel assembly 31 while the motor 34 is longitudinally outwardly of the wheel assembly 28.

The important relation of the parts above described in detail which provides for the greater capacity of the body 10 without restricting the steering, or, in other words, without enlarging the circle through which the shuttle car will travel, is even of greater importance in connection with the motor 43, shaft 44 and wheel assembly 31 than with the motor 34, shaft 39 and wheel assembly 28 for the following reason. In a compensating type of steering mechanism which is generally employed in vehicles, including this one, as disclosed in detail in my application, Serial No. 771,542, above mentioned, when the vehicle has its steering wheels turned the two wheels of each pair of steerable wheels travel through circles of unequal radii, and the inner wheel necessarily travels through the circle having a smaller radius than the radius of travel of the outer wheel. As a consequence the steering wheels are so tied together that when they are turned the inwardly turned wheel or wheels turn or swing through a greater angle than the outwardly turned wheel or wheels. As a consequence of the fact that the wheel of assembly 31 tends to strike its driving shaft 44 due to inward swinging of the wheel assembly 31, it would normally tend to strike said shaft 44 before the wheel of assembly 28 will strike its shaft 39 since the wheel of assembly 28 tends to strike the shaft 39 by outward rather than inward swinging movement. This all assumes, of course, that the clearance between wheel 31 and shaft 44 is the same as the clearance between wheel 28 and shaft 39 when said wheels are in their straight-ahead or non-turning position. Actually therefore the shaft 44 is the true limiting element determining the maximum swinging of the steerable wheels of the assemblies 28, 29, 30 and 31 under the conditions assumed. This makes it possible to swing the shaft 39 outwardly, as viewed in plan and as illustrated in Fig. 1 of the drawings, slightly more than the shaft 44.

This four wheel steering mechanism is controlled by a steering wheel 47 adjacent an operator's station 48 which is located near the rear of the unit and on one side of the boom 23 in a pocket which is formed by the reduced width of said boom 23 as compared with the overall width of the body 10, being located directly to the rear of the wheel assembly 30. As disclosed in said application Serial No. 771,542, the wheel 47 controls a hydraulic valve 49 which in turn controls a motor driven steering gear 50 having a swinging arm connected to the steering mechanism 46. Since the structural details of the steering arrangement per se are not a feature of the invention here claimed but are claimed only in combination, a detailed description thereof is believed unnecessary in view of the disclosure thereof in my application Serial No. 771,542.

The drive shaft 19 of conveyer 18 is driven from an electric motor 51 which is positioned outside or laterally to one side of the conveyer 18 and main frame of the vehicle and is connected to the shaft 19 through gearing including a splined drive shaft and universal joints designated as a whole by the reference character 52 and reduction gearing 53 which is also located laterally of said main frame and said conveyer 18.

Adjacent the rear of the vehicle and on the opposite side of the boom 23 from that where the operator's station 48 is located and rearwardly of the driving and steering wheel 31 on said opposite side of the vehicle there is an electric motor 54 also located laterally of the conveyer 18 and of the boom 23 said motor 54 driving a hydraulic pump 55 through gearing including a splined drive shaft and universal joints designated generally 56. The pump 55 is also located laterally of the conveyer 18 and boom 23. Said pump 55 is the source of hydraulic pressure for a hydraulic control system not disclosed, part of which includes the control valve 49 and steering gear 50, another part of which includes the hydraulic jack 25.

Adjacent said motor 54 and pump 55 is another motor 57 preferably electric, though if desired it may be hydraulic, which motor 57 drives an electric cable reel 58 through gearing which includes a generally upright shaft 59 (see Fig. 5) having a sprocket 60 which meshes with an endless roller chain 61 anchored to a circular shrouding guide 62 which is rigidly attached to the top plate of the reel 58.

As clearly illustrated in Figs. 1 and 3 of the drawings, the electric cable reel is mounted for rotation on a generally vertical or upright axis and a substantial portion thereof extends below the boom 23 and conveyer 18. This makes possible the employment of a relatively large reel which can handle a great length of electric cable 63 which is reeled thereon, while permitting a relatively wide conveyer 18 in the interest of high capacity, as above set forth. This construction of the cable reel also does not interfere with the low overall height of the shuttle car which, of course, is one limiting factor. The cable 63 is adapted to extend rearwardly from the vehicle as illustrated particularly in Fig. 3 of the drawings, or it may be extended forwardly by being reeved around a guide sheave or roller 64. A ventilated resistor box 65 is provided on the rear corner of the vehicle above the cable reel 58, being carried by an adjacent plate member of the body 10.

From the above description it is evident that a shuttle car has been produced which includes the desirable features of four wheel drive and four wheel steer in the preferred and most specific embodiment of the invention. In addition, a number of expedients have been employed to produce high load carrying capacity for any given dimensions. First of all, while preserving the desirable feature of driving pairs of wheels on opposite sides of the vehicle at one end from a common motor through a differential, gearing is employed involving a worm drive differential which allows for a relatively wide conveyer 18 or, in other words, a relatively wide bottom load carrying body. Also all of the driving motors for the various devices are mounted on the body or main frame and located laterally outwardly of the conveyer 18, none of said motors being positioned, even in part, between the lateral extremities of said conveyer. This includes the two motors 34 and 43 which drive the wheel assemblies 28, 29, 30 and 31, the motor 51 which drives the the conveyer 18, and the motor 54 which drives the hydraulic pump 55, said hydraulic pump 55 being similarly located. It also includes the motor 57 which drives the electric cable reel 58. In addition, the positioning of the electric cable reel 58 on an upright axis, a portion of it being adjacent one side of the discharge boom 23 and a portion of it extending directly beneath said discharge boom and the conveyer 18 as it travels thereover, co-operates to produce a compact arrangement contributing towards the desired end of high load carrying capacity.

It is, of course, obvious that within the broad scope of my invention, as expressed in some of the claims, one pair of wheel assemblies, such as the wheel assemblies 28 and 29, may be power driven with or without steering, the other wheel assemblies, such as wheel assemblies 30 and 31, may be only steering wheels, the driving mechanism in such case being eliminated. In addition, it is evident that other and quite different forms of steering mechanism may be provided for the four steering wheel assemblies 28, 29, 30 and 31 or only two of them, as the case may be, since the particular form of steering mechanism illustrated per se is not a significant feature of the invention herein claimed, it being claimed in my companion application Ser. No. 771,542.

It may also be mentioned that the operator's station 48 provides for the operator to sit on appropriate seats and selectively face either direction, depending upon the direction of travel of the shuttle car. It may also be mentioned that the space laterally of the conveyer 18 or outside the receiving portion of the open top material carrying body 10 and within the lateral confines of the body 10 is highly utilized. To illustrate, motor 34 is located forwardly of the wheel assembly 28 and laterally of the conveyer 18 but within the adjacent lateral extremity of the body 10. Motor 51 is similarly located on the opposite side of the vehicle ahead of wheel assembly 29. Motor 43 is located laterally of the conveyer 18 within the lateral boundary of the body 10 and between the wheel assemblies 29 and 31. A controller box 66 is located on the opposite side of the vehicle and between the wheel assemblies 28 and 30, also within the lateral confines of the body 10 and laterally of conveyer 18. The operator's station including the operator's controls is located in the area at one side of the boom 23 and rearwardly of the wheel assembly 29, extending to the adjacent lateral edge of the body 10. On the opposite side of the boom 23 are the motors 54 and 57 and the pump 55 together with the resistor box 65. Below these units is a portion of the reel 58, a portion of which reel also extends directly below the boom 23. As previously mentioned, boom 23 may be vertically adjusted about a horizontal pivotal axis but, of course, motors 54 and 57 as well as cable reel 58 do not move with it but are carried by the body 10 or associated members connected to the main frame of the vehicle.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. A shuttle car including a main frame carrying an open top receptable type body adapted to carry loose coal, a conveyer in the bottom of said body operable to remove the loose coal therefrom, four steerable wheels supporting said body, means for driving said wheels in pairs at opposite ends of said vehicle including a separate driving motor for each pair of wheels at each end of said car, gearing connecting each motor with a pair of wheels at one end of the car, each said gearing including a differential having a worm type ring gear driven from a motor through a driving worm located below and meshing with said ring gear means mounting each said differential and driving motor laterally outside said main frame and near one of said wheels with each motor located longitudinally beyond the periphery of the adjacent wheel, each said gearing also including a drive shaft interconnecting the adjacent motor and driving worm and extending longitudinally of said main frame and into the path of steering swinging movement of the adjacent steerable wheel if said swinging movement were unlimited, and shaft driving means extending in opposite directions from each said differential, one of said shaft driving means extending laterally across said main frame to a position near one wheel.

2. A shuttle car including an open top receptacle type body adapted to carry loose coal, a conveyer in the bottom of said body operable to remove the loose coal therefrom, means for supporting said body and propelling said shuttle car including a pair of steerable wheels at one end of said frame and at opposite sides thereof, a common driving motor for said wheels, gearing connecting said motor with said wheels, said gearing including a differential having a worm type ring gear driven from said motor through a driving worm located below and meshing with said ring gear, said differential and driving motor being located outside said main frame and near and longitudinally beyond one of said wheels, a drive shaft between said motor and worm in the path of swinging movement of said one near wheel, and shaft driving means extending in opposite directions from said differential, one of said shaft driving means extending laterally across said main frame to a position adjacent one of said wheels.

3. A shuttle car including an open top load carrying body having a discharge boom at one end, conveyer means forming the bottom of said body and extending through said discharge boom and adapted to discharge material therefrom, an electric cable reel, driving motor means therefor, and means mounting said cable reel for rotation on an upright axis and positioning it at least in part directly below said conveyer means and below said discharge boom.

4. A shuttle car including a load carrying body, a discharge boom extending from one end of said body, a continuous conveyer in the bottom of said body extending through said boom and adapted to discharge material therefrom, an operator's station located adjacent said boom on one side thereof, a cable reel adjacent the boom on the other side thereof, means mounting said reel for rotation on an upright axis, at least part of said reel extending directly beneath said boom, and a pair of motors adjacent said boom and said reel, one of said motors constituting the operating motor for said reel.

5. A shuttle car including a load carrying body, a discharge boom extending from one end of said body, a continuous conveyer in the bottom of said body extending through said boom and adapted to discharge material therefrom, an operator's station located adjacent said boom on one side thereof, a cable reel adjacent the boom on the other side thereof, means mounting said reel for rotation on an upright axis, at least part of said reel extending directly beneath said boom, and a pair of motors adjacent said boom and said reel.

6. A shuttle car including a main frame, an open top receptacle type body thereon adapted to carry loose coal, a conveyer in the bottom of said body operable to remove the loose coal therefrom, four steerable wheels supporting said frame and body, and means to drive said wheels in pairs at opposite ends of said vehicle including a separate driving motor at each end of said car, gearing connecting each motor with the pair of wheels at the adjacent end of the car, each said gearing including a differential driven from a motor and located outside said main frame and near one of said wheels, shaft driving means extending in opposite directions from said differential, one of said shaft driving means extending laterally across said main frame to one wheel, and universal joint drive means extending on a generally horizontal axis and connecting one of said differential shaft driving means to the wheel near said differential.

ARTHUR L. LEE.

REFERENCES CITED

The following references are of record in the file of this patent:

UNITED STATES PATENTS

| Number | Name | Date |
| --- | --- | --- |
| 1,036,660 | Lindsay | Aug. 27, 1912 |
| 1,203,390 | Noble | Oct. 31, 1916 |
| 1,364,398 | Martin et al. | Jan. 4, 1921 |
| 1,763,424 | Duncan | June 10, 1930 |
| 1,810,194 | Weaver | June 16, 1931 |
| 1,828,751 | Shelburne | Oct. 27, 1931 |
| 1,891,562 | Levin | Dec. 20, 1932 |
| 2,225,185 | Sloane | Dec. 17, 1940 |
| 2,274,313 | Whaley | Feb. 24, 1942 |
| 2,317,623 | Lee | Apr. 27, 1943 |
| 2,325,731 | Arentzen et al. | Aug. 3, 1943 |
| 2,357,742 | Jeffrey | Sept. 5, 1944 |
| 2,359,123 | Krapf | Sept. 26, 1944 |
| 2,381,672 | Lee | Aug. 7, 1945 |
| 2,399,619 | Beck | May 7, 1946 |
| 2,426,980 | Ball | Sept. 9, 1947 |
| 2,457,569 | Lee | Dec. 28, 1948 |